(12) United States Patent
Wang

(10) Patent No.: US 11,265,768 B2
(45) Date of Patent: Mar. 1, 2022

(54) EPS BEARER IDENTIFIER ALLOCATION METHOD AND DEVICE, SMF AND PCF

(71) Applicant: CHINA ACADEMY OF TELECOMMUNICATIONS TECHNOLOGY, Beijing (CN)

(72) Inventor: Hucheng Wang, Beijing (CN)

(73) Assignee: Datang Mobile Communications Equipment Co., Ltd., Beijing (CN)

(*) Notice: Subject to any disclaimer, the term of this patent is extended or adjusted under 35 U.S.C. 154(b) by 95 days.

(21) Appl. No.: 16/495,610

(22) PCT Filed: Mar. 13, 2018

(86) PCT No.: PCT/CN2018/078841
§ 371 (c)(1),
(2) Date: Sep. 19, 2019

(87) PCT Pub. No.: WO2018/171468
PCT Pub. Date: Sep. 27, 2018

(65) Prior Publication Data
US 2020/0015130 A1 Jan. 9, 2020

(30) Foreign Application Priority Data
Mar. 20, 2017 (CN) .......................... 201710166764.1

(51) Int. Cl.
*H04W 36/00* (2009.01)
*H04W 76/11* (2018.01)
*H04W 36/30* (2009.01)

(52) U.S. Cl.
CPC ... *H04W 36/0033* (2013.01); *H04W 36/0016* (2013.01); *H04W 36/30* (2013.01); *H04W 76/11* (2018.02)

(58) Field of Classification Search
CPC ............. H04W 36/0033; H04W 76/11; H04W 36/0016; H04W 36/30
See application file for complete search history.

(56) References Cited

U.S. PATENT DOCUMENTS

2010/0103862 A1* 4/2010 Ulupinar ........... H04L 29/12207
370/315
2011/0206013 A1 8/2011 Aramoto
(Continued)

FOREIGN PATENT DOCUMENTS

CN 101365159 A 2/2009
CN 101478743 A 7/2009
(Continued)

OTHER PUBLICATIONS

SA WG2 Temporary Document, SA WG2 Meeting #119, S2-171608, Feb. 13-17, 2017, Dubrovnik, Croatia, Source: NTT Docomo, Intel, Title: TS 23.502: NX-Based Handover Procedure, Document For: Approval, Agenda Item: 6.5.9, Work Item / Release: Nextgen/Rel-15.
(Continued)

*Primary Examiner* — Natasha W Cosme
(74) *Attorney, Agent, or Firm* — Harness, Dickey & Pierce, P.L.C.

(57) ABSTRACT

A method and a device of allocating an EPS bearer identifier, an SMF, and a PCF are provided. The method includes mapping a session/connection to an EPS bearer, and requesting a UE or an AMF to allocate an EPS bearer identifier to a mapped EPS bearer.

15 Claims, 7 Drawing Sheets

(56) References Cited

U.S. PATENT DOCUMENTS

2012/0224564 A1  9/2012  Paisal et al.
2018/0192337 A1* 7/2018  Ryu ................. H04W 36/0066

FOREIGN PATENT DOCUMENTS

| CN | 101998296 A    | 3/2011  |
|----|----------------|---------|
| CN | 102696187 A    | 9/2012  |
| EP | 2219321 A      | 8/2010  |
| WO | 2010/053066 A1 | 4/2012  |
| WO | 2015149271 A1  | 10/2015 |

OTHER PUBLICATIONS

The State Intellectual Property Office of People's Republic of China, China Academy of Telecommunications Technology, Title of Invention: EPS Bearer Identification Allecation Methond and Device as Well as SMF and PCF, First Office Action, Publication Date: Mar. 30, 2011.

Office Action, Notice of Reasons for Refusal, Application number: Japanese Patent Application No. 2019-552270, Date of Drafting: Reiwa 2 Oct. 1, 2020 Patent examiner: Tabei, Kazuhiko 4778 5J00, Representative/Applicant: Patent business corporation Shin-Ei Patent Firm, Applied Provisions: Article 29(2), Article 36.

SA WG2 Temporary Document, SA WG2 Meeting #119, S2-17xxxx, Feb. 13-17, 2017, Dubrovnik, Croatia, Source: NTT DOCOMO, Title: Nx-based interworking procedures from QoS point of view, Document for: Discussion, Agenda Item: 6.5.5, Work Item / Release: NextGen/Rel-15.

SA WG2 Temporary Document, SA WG2 Meeting #119, S2-171503, Feb. 13-17, 2017, Dubrovnik, Croatia, was 0937, Source: NTT Docomo, . . . , Title: TS 23.502: Nx-based Handover procedure, Document for: Approval, Agenda Item: 6.5.9, Work Item / Release: NextGen/Rel-15.

3GPP TS 23.502, V0.2.0 (Dec. 2017), Technical Specification, 3rd Generation Partnership Project; Technical Specification Group Services and System Aspects; Procedures for the 5G System; Stage 2; (Release 15), Server Date Feb. 24, 2017.

European Search Report, European Patent Office, Munich, Germany, dated Dec. 12, 2019, PCT/CN2018078841, China Academy of Telecommunications Technology, Communication.

SA WG2 Meeting #118, S2-167000, Nov. 14-18, 2016, Reno, Nevada, USA, (Revision of S2-16XXXX), Source: Huawei, Hisilicon, Title: Comparison of the Options for Session ID Allocation and Routing of Subsequent SM Signalling, Document For: Approval, Agenda Item: 6.10.4, Work Item / Release: FS_Nextgen / Rel-14.

SA WG2 Meeting #119, S2-170937, Feb. 13-17, 2017, Dubrovnik, Croatia, Source: NTT Docomo, Title: TS 23.502: Nx-Based Handover Procedure, Document For: Approval, Agenda Item: 6.5.9, Work Item / Release: Nxtgen/Rel-15.

SA WG2 Meeting #120, S2-172175, Mar. 27-31, 2017, Busan, Korea, (Revision of S2-17XXXX), Source: CATT, Title: TS 23.502: Discussion on EPS Bearer ID Allocation During Inter-Rat Handover From 5GS To EPS, Document For: Discussion / Approval, Agenda Item: 6.5.9, Work Tem / Release: 5GS_PH1 / Rel-15.

Patent Cooperation Treaty, Written Opinion, International Search Report, Advance Email, dated Oct. 3, 2019, PCT/CN2018/078841, dated Mar. 13, 2018, China Academy of Telecommunications Technology.

* cited by examiner

EPS BEARER IDENTIFIER ALLOCATION METHOD AND DEVICE, SMF AND PCF

CROSS-REFERENCE TO RELATED APPLICATION

The present application is a U.S. national phase application of a PCT Application No. PCT/CN2018/078841 filed on Mar. 13, 2018, which claims a priority to a Chinese patent application No. 201710166764.1 filed in China on Mar. 20, 2017, the disclosures of which are incorporated herein by reference in their entirety.

TECHNICAL FIELD

The present disclosure relates to the field of communication technology, and more particularly, relates to an EPS bearer identifier allocation method and device, a SMF, and a PCF.

BACKGROUND

In order to ensure a normal operation of a Fifth Generation (5G, for short) mobile communication system, a 5G network needs to support interoperations with a Long Term Evolution (LTE) network based on a universal mobile communication technology. One of the interoperations is accomplished through an inter-RAT (Inter-Radio Access Technology) handover between the 5G network and the LTE network. However, a session in the 5G network is identified by a Packet Data Unit (PDU, for short) session identifier (PDU session ID); but a session in the LTE network is identified by an Evolved Packet System (EPS, for short) bearer identifier (EPS bearer ID). Therefore, when performing the inter-RAT handover, how to identify a same session in different networks needs to considered.

In a network architecture supporting the interoperations between the 5G network and the LTE network, a Nx interface between a Mobility Management Entity (MME, for short) in the LTE network) and an Access and Mobility Management Function (Authentication Management Function, AMF for short) entity in the 5G network is optionally supported. When the networks support the Nx interface, the networks may support a handover between the 5G network and the LTE network. In such a case, context information of a terminal (UE) needs to be communicated between the MME and the AMF. The context information includes a mobility context and a context of a session/connection. When the UE accesses such networks supporting the Nx interface, the networks may configure a registration mode of the UE as a single registration mode.

In a case that the networks do not support the Nx interface, the handover is not supported between the 5G network and the LTE network. In such a case, in order to support the interoperations, the networks need to require the UE to perform dual registrations (i.e., a dual registration mode). That is, the registrations are maintained at both the LTE network and the 5G network. Considering supports of traffic continuity in the dual registration mode, a System Management Function entity (SMF, for short) in a control plane in the networks is required to support a function of PGW-C concurrently, so that through a HO registration, a session/connection of the UE is continuously anchored at a same user plane anchor point when the UE roams between the LTE network and the 5G network.

The UE in the dual registration mode may be further provided with a single broadcast capability and a dual broadcast capability. The UE with the single broadcast capability may only maintain a session/connection with one side at a same time, either with the LTE network or with the 5G network. In such a case, when the UE moves between the LTE network and the 5G network, packet loss may inevitably occur and seamless traffic continuity may not be guaranteed. The UE with the dual broadcast capability may maintain connections with the LTE network and with the 5G network concurrently. Thus, when the UE moves between the networks, a handover between the connections may be performed in a make-before-break manner. That is, data is still received from a source network while the data is received from a target network, so that the traffic continuity may be ensured.

A handover process of the UE in the single registration mode from the 5G network to the LTE network is mainly as follows:

S1: After the AMF receives a handover request from a Residential Access Network (RAN), the AMF requests all SMFs to perform mapping of a PDU session context; the SMFs return an EPS bearer context to the AMF after the PDU session context is converted into the EPS bearer context; in such a case, non-GBR QoS flows of data are mapped to a default bearer, and GBR QoS flows are mapped to a dedicated bearer.

S2: After the AMF receives the EPS bearer context returned by all SMFs, the AMF generates a UE context based on a mobility context of the UE, and transmits the UE context to the MME through the Nx interface.

S3: A MME at a target side considers the Nx interface as a S10 interface, that is, the AMF is considered as a MME, and after the MME at the target side receives the UE context through the Nx interface, the MME at the target side continues subsequent processes according to a S1 handover procedure of a related EPS system.

S4: After the SMF/PGW-C determines that a session of the UE is handed over to the LTE network, a dedicated bearer activation procedure may be initiated to establish a dedicated bearer for certain non-GRB QoS flows.

A related protocol describes that the SMF needs to perform mapping between the PDU session context and the EPS bearer context, but a PDU session is identified by the PDU session ID, and the PDU session ID is allocated by the UE; when a PDU session is mapped into a plurality of EPS bearers, a problem of how to allocate bearer identifiers of the EPS bearers has not been solved.

SUMMARY

A method and a device of allocating an EPS bearer identifier, a SMF, and a PCF are provided in the present disclosure.

In a first aspect, a method of allocating an Evolved Packet System (EPS) bearer identifier is provided in the present disclosure. The method is applied to a Session Management Function (SMF) entity and includes: mapping a session/connection to an Evolved Packet System (EPS) bearer; and requesting a User Equipment (UE) or an Access and Mobility management Function (AMF) entity to allocate an EPS bearer identifier to the mapped EPS bearer.

Optionally, requesting the UE or the AMF entity to allocate the EPS bearer identifier to the mapped EPS bearer, includes: transmitting a first message to the UE to request the UE to allocate the EPS bearer identifier to the mapped EPS bearer, wherein the first message carries information of the mapped EPS bearer; or transmitting a second message to the AMF to request the AMF to allocate the EPS bearer identifier to the mapped EPS bearer, wherein the second message carries information of the mapped EPS bearer or the number of EPS bearers.

Optionally, an EPS bearer identifier of a dedicated bearer in the information of the EPS bearer is temporarily set to a null value, a temporary value, or a reserved value.

Optionally, an EPS bearer identifier of a default bearer in the information of the EPS bearer is set as a Packet Data Unit (PDU) session identifier or is temporarily set as the PDU session identifier.

Optionally, the information of the EPS bearer carries a mapping relation between the EPS bearer and a Quality of Service data flow (QoS flow) or a mapping relation between the EPS bearer and a Traffic Flow Template (TFT).

Optionally, the number of EPS bearers is the number of dedicated bearers.

Optionally, the first message is a Packet Data Unit (PDU) Session Establishment Accept message.

Optionally, before transmitting the second message to the AMF, the method further includes: receiving a Packet Data Unit (PDU) Session Establishment Request message from the UE; or receiving an EPS bearer context request message transmitted by the AMF.

Optionally, the method further includes: receiving the EPS bearer identifier of the mapped EPS bearer being allocated to the mapped EPS bearer by the UE or the AMF; and determining an EPS bearer context or parameter information of a related EPS bearer based on the EPS bearer identifier and the information of the mapped EPS bearer.

Optionally, when the AMF allocates the EPS bearer identifier to the mapped EPS bearer, the method further includes: notifying the UE of the EPS bearer context or the parameter information of the related EPS bearer.

In a second aspect, a method of allocating an Evolved Packet System (EPS) bearer identifier is provided in the present disclosure. The method is applied to a Policy and Charging Control (PCC) system or a Policy Control Function (PCF) entity and includes: determining to map a Quality of Service (QoS) parameter of a session/connection to an Evolved Packet System (EPS) QoS parameter; determining, based on the EPS QoS parameter in the mapping, a mapped EPS bearer; and allocating an EPS bearer identifier to the mapped EPS bearer.

Optionally, the method further includes: transmitting, to a Session Management Function (SMF) entity, information of the mapped EPS bearer, wherein the information of the EPS bearer includes the EPS bearer identifier and the QoS parameter of the EPS bearer.

Optionally, determining to map the QoS parameter of the session/connection to the EPS QoS parameter, includes: determining, based on a type of a Session Management Function (SMF) entity serving the session/connection, to map the QoS parameter of the session/connection to the EPS QoS parameter; or determining, based on a request from the SMF serving the session/connection, to map the QoS parameter of the session/connection to the EPS QoS parameter.

Optionally, the type of the SMF is an SMF supporting both a Fifth Generation Mobile Communication System (5G) session management function and an EPS Packet Data Gateway Control (PGW-C) function.

In a third aspect, a device of allocating an Evolved Packet System (EPS) bearer identifier is provided in the present disclosure. The device is applied to a Session Management Function (SMF) entity and includes: a mapping module, configured to map a session/connection to an Evolved Packet System (EPS) bearer; and a request module, configured to request a User Equipment (UE) or an Access and Mobility management Function (AMF) entity to allocate an EPS bearer identifier to a mapped EPS bearer.

Optionally, the request module includes: a first transmission unit, configured to transmit a first message to the UE to request the UE to allocate an EPS bearer identifier to the mapped EPS bearer, wherein the first message carries information of the mapped EPS bearer; and a second transmission unit, configured to transmit a second message to the AMF to request the AMF to allocate an EPS bearer identifier to the mapped EPS bearer, wherein the second message carries information of the mapped EPS bearer or the number of EPS bearers.

Optionally, an EPS bearer identifier of a dedicated bearer in the information of the EPS bearer is temporarily set to a null value, a temporary value, or a reserved value.

Optionally, an EPS bearer identifier of a default bearer in the information of the EPS bearer is set as a Packet Data Unit (PDU) session identifier or is temporarily set as the PDU session identifier.

Optionally, the information of the EPS bearer carries a mapping relation between the EPS bearer and a Quality of Service data flow (QoS flow) or a mapping relation between the EPS bearer and a Traffic Flow Template (TFT).

Optionally, the number of EPS bearers is the number of dedicated bearers.

Optionally, the first message is a Packet Data Unit (PDU) Session Establishment Accept message.

Optionally, the device further includes: a first reception module, configured to receive a Packet Data Unit (PDU) Session Establishment Request message from the UE, or receive an EPS bearer context request message transmitted by the AMF.

Optionally, the device further includes: a second reception module, configured to receive an EPS bearer identifier of a mapped EPS bearer being allocated to the mapped EPS bearer by the UE or the AMF; and a first determination module, configured to determine an EPS bearer context or parameter information of a related EPS bearer based on the EPS bearer identifier and the information of the mapped EPS bearer.

Optionally, the AMF allocates the EPS bearer identifier to the mapped EPS bearer, and the device further includes: a notifying module, configured to notify the UE of the EPS bearer context or the parameter information of the related EPS bearer.

In a fourth aspect, a device of allocating an Evolved Packet System (EPS) bearer identifier is provided in the present disclosure. The device is applied to a Policy and Charging Control (PCC) system or a Policy Control Function (PCF) entity and includes: a second determination module, configured to determine to map a Quality of Service (QoS) parameter of a session/connection to an Evolved Packet System (EPS) QoS parameter; a third determination module, configured to determine, based on the EPS QoS parameter in the mapping, a mapped EPS bearer; and an allocation module, configured to allocate an EPS bearer identifier to the mapped EPS bearer.

Optionally, the device further includes: a transmission module, configured to transmit, to a Session Management Function (SMF) entity, information of the mapped EPS bearer, wherein the information of the EPS bearer includes the EPS bearer identifier and the QoS parameter of the EPS bearer.

Optionally, the second determination module is specifically configured to: determine, based on a type of a Session Management Function (SMF) entity serving the session/connection, to map the QoS parameter of the session/ connection to the EPS QoS parameter; or determine, based on a request from the SMF serving the session/connection, to map the QoS parameter of the session/connection to the EPS QoS parameter.

Optionally, the type of the SMF is an SMF supporting both a Fifth Generation (5G) session management function and an EPS Packet Data Gateway Control (PGW-C) function.

In a fifth aspect, a Session Management Function (SMF) entity is provided in the present disclosure, and includes: a first storage, a first processor, and a computer program stored on the first storage and executable on the first processor, wherein when the first processor executes the computer program, the first processor implements steps of the method applied to the SMF according to the first aspect.

In a sixth aspect, a Policy Control Function (PCF) entity is provided in the present disclosure, and includes: a second storage, a second processor, and a computer program stored on the second storage and executable on the second processor, wherein when the second processor executes the computer program, the second processor implements steps of the method applied to the PCF according to the second aspect.

In a seventh aspect, a non-volatile storage medium is provided in the present disclosure, and includes a program and an instruction stored on the non-volatile storage medium, wherein when the program and the instruction are executed by a processor, the processor implements the method applied to the SMF according to the first aspect.

In an eighth aspect, a non-volatile storage medium is provided in the present disclosure and includes a program and an instruction stored on the non-volatile storage medium, wherein when the program and the instruction are executed by a processor, the processor implements the method applied to the PCF according to the second aspect.

The method of allocating the EPS bearer identifier in the present disclosure may, by mapping the session/connection to the EPS bearer, requesting the UE or the AMF to allocate the EPS bearer identifier to the mapped EPS bearer, allocate the EPS bearer identifier to the mapped EPS bearer, when the session/connection is mapped to the EPS bearer, thereby realizing a normal operation of an inter-system handover between the 5G network and the LTE network.

BRIEF DESCRIPTION OF THE DRAWINGS

In order to more clearly illustrate technical solutions of the embodiments of the present disclosure, accompany drawings to be used in the embodiments of the present disclosure will be briefly described below. It is apparent that the accompanying drawings in the following description are only some embodiments of the present disclosure; for those of ordinary skills in the art, other drawings may also be obtained from these drawings without paying creative labor.

DETAILED DESCRIPTION

The technical solutions in the embodiments of the present disclosure will be clearly and completely described in conjunction with the drawings in the embodiments of the present disclosure. It is apparent that the described embodiments are some, rather than all, of the embodiments of the present disclosure. Based on the embodiments of the present disclosure, all other embodiments obtained by those of ordinary skills in the art without paying creative labor are within the protection scope of the present disclosure.

Directed to a problem in the related art that, when a mapping is performed for a session/connection and an Evolved Packet System (EPS) bearer, how to allocate an EPS bearer identifier to the EPS bearer generated in the mapping is not addressed, the embodiments of the present disclosure provide a method of allocating an EPS bearer identifier, a device of allocating an EPS bearer identifier, and a System Management Function (SMF) entity. When the mapping is performed for the session/connection and the EPS bearer, a User Equipment (UE) or an Authentication Management Function (AMF, for short) is requested to allocate an EPS bearer identifier to the mapped EPS bearer, and when performing the mapping of the session/connection to the EPS bearer, the EPS bearer identifier may be allocated to the mapped EPS bearer, thereby realizing a normal operation of an inter-system handover between a Fifth Generation (5G, for short) mobile communication system network and a Long Term Evolution (LTE, for short) network.

Figure 1:
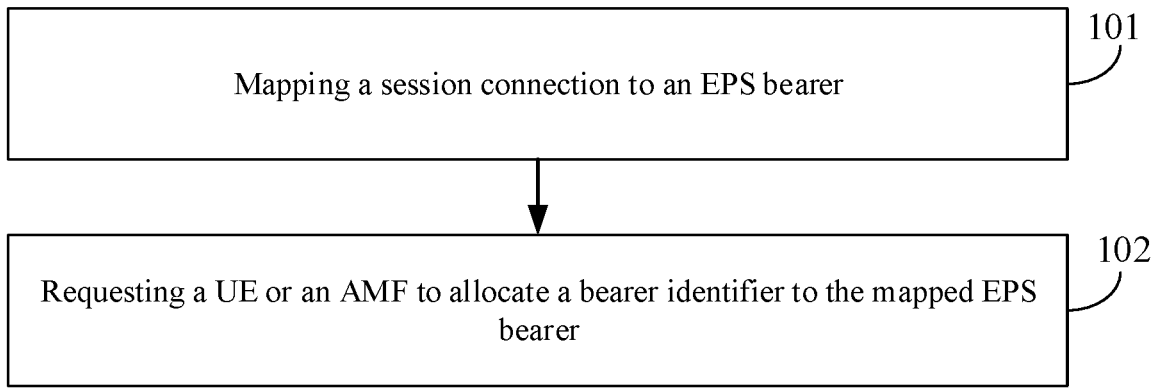
FIG. 1 is a flowchart of a method of allocating an EPS bearer identifier of the present disclosure.

Referring to FIG. 1, FIG. 1 is a flowchart of a method of allocating an EPS bearer identifier according to the present disclosure. The method of allocating the EPS bearer identifier provided in the embodiments is applied to a SMF, and includes following steps 101 to 102, which are described in detail below.

Step 101: mapping a session/connection to an EPS bearer.

The session/connection may be a session/connection in a 5G system, i.e., a 5G session/connection or a PDU session/connection. After the SMF receives a session management request message from an AMF, the SMF may map a related session/connection to the EPS bearer, that is, perform mapping of the session/connection to the EPS bearer.

Specifically, when the session/connection is a PDU session/connection, the mapping of the PDU session/connection to the EPS bearer performed by the SMF may specifically include: mapping non-GBR QoS flows in the PDU session to a default bearer, and setting an EPS bearer identifier of the default bearer as a PDU session identifier or temporarily setting the EPS bearer identifier of the default bearer as a PDU session identifier; mapping all GBR QoS flows in the PDU session to a plurality of dedicated bearers, and after the mapping to the dedicated bearers is completed, setting associated EPS bearer identifiers of all of the dedicated bearers as PDU session identifiers, and temporarily setting EPS bearer identifiers of all of the dedicated bearers as a null value, temporary values or reserved values; whereas if a value of the PDU session identifier does not fall within 5-15 or if the associated EPS bearer identifiers need to be set as temporary values because of a requirement of network configuration or strategy, a UE may reallocate the associated EPS bearer identifiers subsequently.

It should be noted that a rule of the mapping in the present disclosure may be determined by an implementation of the SMF or a policy of an operator, and the present disclosure is not limited thereto.

Step 102: requesting a UE or an AMF to allocate an EPS bearer identifier to a mapped EPS bearer.

When the SMF requests the UE or the AMF to allocate the EPS bearer identifier to the mapped EPS bearer, the SMF may request the UE or the AMF to allocate respective bearer identifiers to the mapped EPS bearers, the SMF may also request the AMF to allocate a uniform bearer identifier to the mapped EPS bearers, whether the respective bearer identifiers or the uniform bearer identifier is allocated depends on specific situations.

In general, in order to ensure a normal operation of an inter-system handover between a 5G network and a LTE network, the SMF needs to acquire an EPS bearer context after the mapping is completed. An actual acquisition of the EPS bearer context needs to process, based on the allocated bearer identifier, mapped EPS bearer information, such as update an identifier of an EPS dedicated bearer being temporarily set. The EPS bearer context may specifically include identification information of each bearer, tunnel endpoint information of the bearer, QoS parameters of the bearer, and the like.

Therefore, in this embodiment, the method further includes steps 103-104.

Step 103: receiving the EPS bearer identifier allocated to the mapped EPS bearer by the UE or the AMF.

Step 104: determining the EPS bearer context or parameter information of a related EPS bearer based on the EPS bearer identifier and information of the mapped EPS bearer.

Further, in a case that the AMF allocates the EPS bearer identifier to the mapped EPS bearer, after the SMF determines the EPS bearer context or the parameter information of the related EPS bearer, the SMF may also notify the UE of the EPS bearer context or the parameter information of the related EPS bearer, so that the UE may be informed of information of the related EPS bearer in time. The SMF may also transmit the EPS bearer context to the AMF.

In order to guarantee a normal operation of a base station node at an access network side, after the SMF receives the bear identifier of the mapped EPS bearer allocated to the mapped EPS bearer by the UE or the AMF, the EPS bearer identifier allocated to the mapped EPS bearer may also be transmitted to the base station node at the access network side.

The method of allocating the EPS bearer identifier according to the embodiments of the present disclosure maps the session/connection to the EPS bearer, and requests the UE or the AMF to allocate the EPS bearer identifier to the mapped EPS bearer, and thus, when the mapping of the session/connection to the EPS bearer is performed, an EPS bearer identifier may be allocated to the mapped EPS bearer, thereby realizing the normal operation of the inter-system handover between the 5G network and the LTE network.

The above embodiments illustrate a basic implementation process of the method of allocating an EPS bearer identifier in the present disclosure. Some specific implementation processes of the method of allocating an EPS bearer identifier in the present disclosure are described below.

Figure 2:
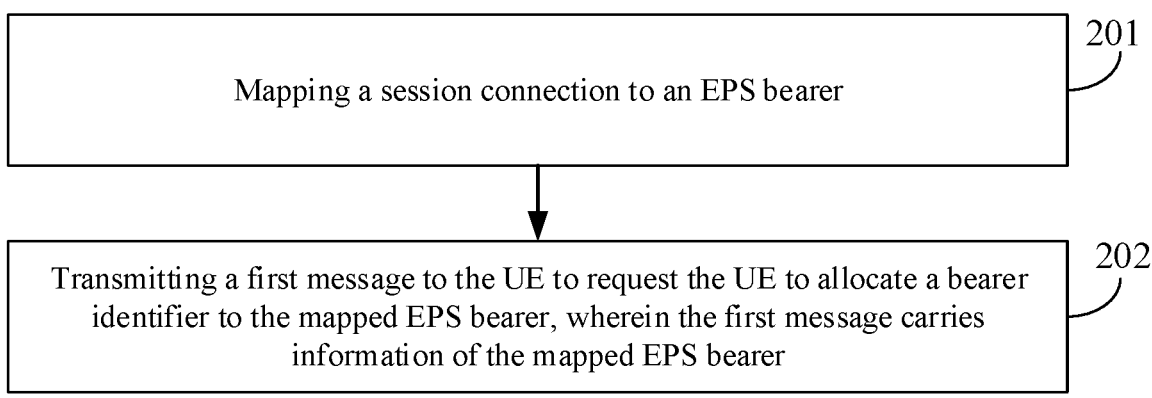
FIG. 2 is a flowchart of a method of allocating an EPS bearer identifier according to the present disclosure.

Referring to FIG. 2, FIG. 2 is a flowchart of a method of allocating an EPS bearer identifier in the present disclosure. The method of allocating the EPS bearer identifier provided by the embodiments of the present disclosure is applied to the SMF, and includes following steps 201 to 202, which are described in detail below.

Step 201: mapping a session/connection to an EPS bearer.

The session/connection may be a session/connection in a 5G system, i.e., a 5G session/connection or a PDU session/connection. After the SMF receives a session management request message from the AMF, the SMF may map a related session/connection to the EPS bearer, that is, perform mapping of the session/connection to the EPS bearer.

Specifically, in a case that the session/connection is a PDU session/connection, the mapping of the PDU session/connection to the EPS bearer performed by the SMF may specifically include: mapping non-GBR QoS flows in the PDU session to a default bearer, and setting an EPS bearer identifier of the default bearer as a PDU session identifier or temporarily setting the EPS bearer identifier of the default bearer as a PDU session identifier; mapping all GBR QoS flows in the PDU session to a plurality of dedicated bearers, and after the mapping to the dedicated bearers is completed, setting associated EPS bearer identifiers of all of the dedicated bearers as PDU session identifiers, and temporarily setting EPS bearer identifiers of all of the dedicated bearers as a null value, temporary values or reserved values; whereas if a value of the PDU session identifier does not fall within 5-15 or if the associated EPS bearer identifiers need to be set as temporary values because of a requirement of network configuration or strategy, a UE may reallocate the associated EPS bearer identifiers subsequently.

It should be noted that a rule of the mapping in the present disclosure may be determined by an implementation of the SMF or a policy of an operator, and the present disclosure is not limited thereto.

Step 202: transmitting a first message to the UE to request the UE to allocate an EPS bearer identifier to the mapped EPS bearer, wherein the first message carries information of the mapped EPS bearer.

The first message is, for example, a PDU Session Establishment Accept message. An EPS bearer identifier of a dedicated bearer in the information of the EPS bearer is temporarily set to a null value, a temporary value, or a reserved value. An EPS bearer identifier of a default bearer in the information of the EPS bearer is set as a Packet Data Unit (PDU) session identifier or is temporarily set as the PDU session identifier.

When the UE allocates an EPS bearer identifier to the mapped EPS bearer, bearer identifiers may be respectively allocated, based on a Quality of Service (QoS) flow ID (QFI, for short) or a Traffic Flow Template (TFT), to mapped EPS bearers. Therefore, the information of the EPS bearer transmitted by the SMF to the UE may carry a mapping relation between the EPS bearer and a QoS flow or a mapping relation between the EPS bearer and the TFT.

Figure 3:
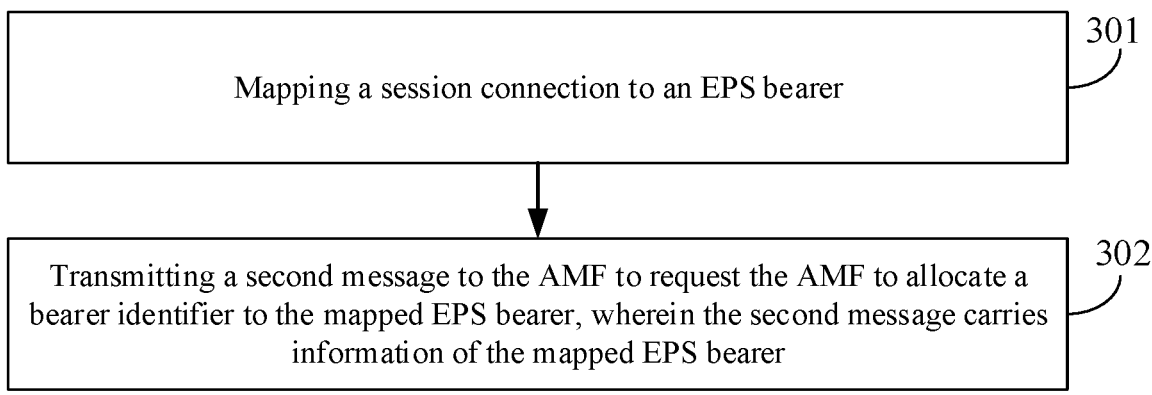
FIG. 3 is another flowchart of a method of allocating an EPS bearer identifier according to the present disclosure.

Referring to FIG. 3, FIG. 3 is another flowchart of a method of allocating an EPS bearer identifier in the present disclosure. The embodiments of the present disclosure provide another example of a method of allocating the EPS bearer identifier. The method is applied to the SMF, and includes following steps 301 to 302, which are described in detail below.

Step 301: mapping a session/connection to an EPS bearer.

The session/connection may be a session/connection in a 5G system, i.e., a 5G session/connection or a PDU session/connection. After the SMF receives a session management request message from an AMF, the SMF may map a related session/connection to the EPS bearer, that is, perform mapping of the session/connection to the EPS bearer.

Specifically, when the session/connection is a PDU session/connection, the mapping of the PDU session/connection to the EPS bearer performed by the SMF may specifically include: mapping non-GBR QoS flows in the PDU session to a default bearer, and setting an EPS bearer identifier of the default bearer as a PDU session identifier or temporarily setting the EPS bearer identifier of the default bearer as a PDU session identifier; mapping all GBR QoS flows in the PDU session to a plurality of dedicated bearers, and after the mapping to the dedicated bearers is completed, setting associated EPS bearer identifiers of all of the dedicated bearers as PDU session identifiers, and temporarily setting EPS bearer identifiers of all of the dedicated bearers as a null value, temporary values or reserved values; whereas if a value of the PDU session identifier does not fall within 5-15 or if the associated EPS bearer identifiers need to be set as temporary values because of a requirement of network configuration or strategy, a UE may reallocate the associated EPS bearer identifiers subsequently.

Step 302: transmitting a second message to the AMF to request the AMF to allocate an EPS bearer identifier to the mapped EPS bearer, wherein the second message carries information of the mapped EPS bearer.

The SMF may also receive a PDU session establishment request message transmitted by a UE before the SMF transmits the second message to the AMF. An EPS bearer identifier of a dedicated bearer in the information of the EPS bearer is temporarily set to a null value, a temporary value, or a reserved value. An EPS bearer identifier of a default bearer in the information of the EPS bearer is set as a Packet Data Unit (PDU) session identifier or is temporarily set as the PDU session identifier.

When the AMF allocates the EPS bearer identifier to the mapped EPS bearer, the AMF may allocates, based on a Quality of Service (QoS) flow ID (QFI, for short), respective bearer identifiers for mapped EPS bearers. Therefore, the information of the EPS bearer transmitted by the SMF to the UE may carry a mapping relation between the EPS bearer and a QoS flow.

A process of allocating an EPS bearer identifier provided in the present disclosure will be described in detail with reference to FIGS. 4 to 6.

First Example

Figure 4:
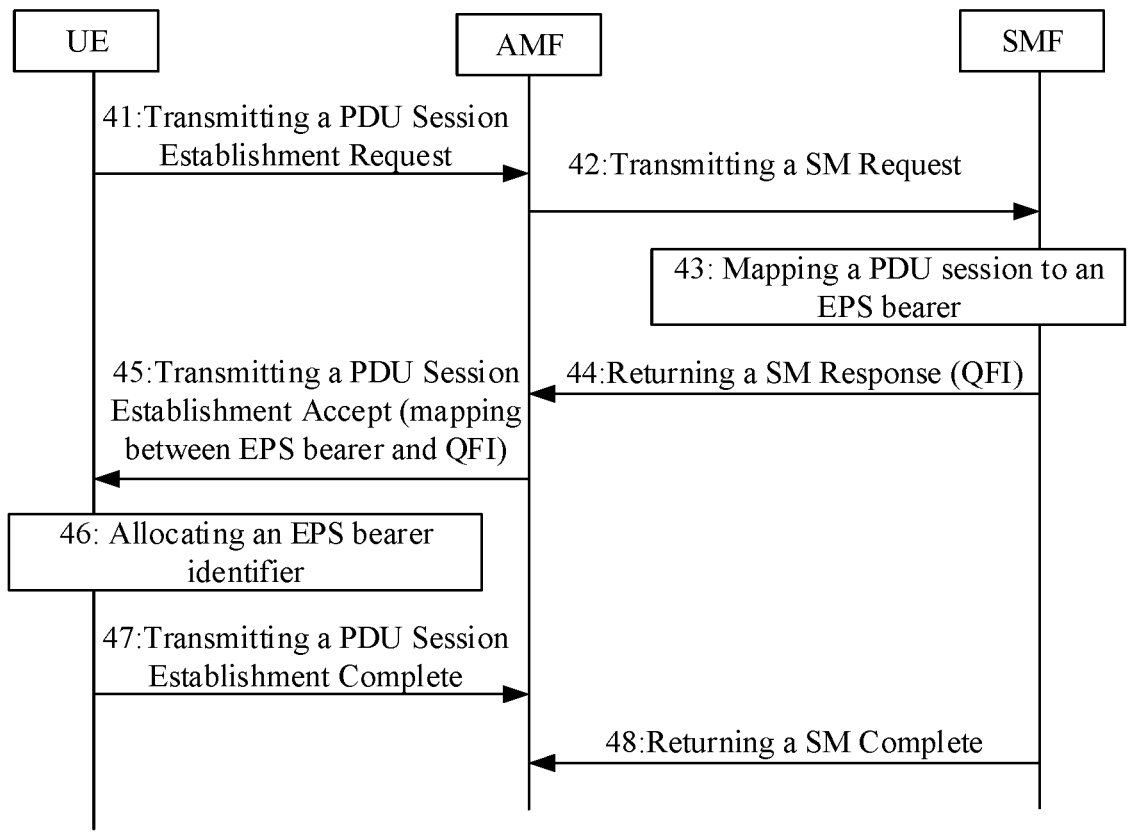
FIG. 4 is a flowchart of a first example of a process of allocating an EPS bearer identifier according to the present disclosure.
Figure 5:
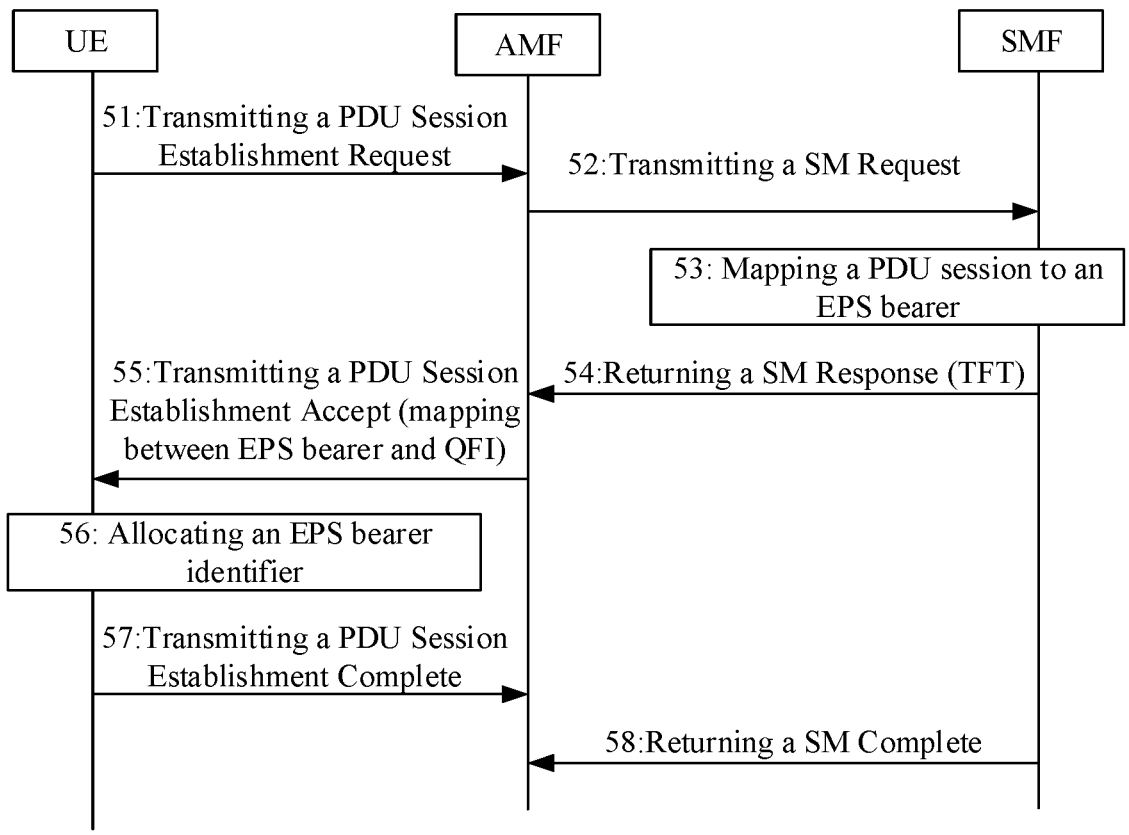
FIG. 5 is a flowchart of a second example of a process of allocating an EPS bearer identifier according to the present disclosure.

FIG. 4 illustrates a flowchart of a first example of a process of allocating an EPS bearer identifier provided in the present disclosure. In the first example, the EPS bear identifier is allocated by the UE based on the QFI. Referring to FIG. 4, the process of allocating the EPS bearer identifier in the first example includes following steps 41-48.

Step 41: transmitting, by the UE, a PDU Session Establishment Request message to an AMF.

Step 42: after the AMF receives the PDU Session Establishment Request message from the UE, transmitting, by the AMF, a Session Management (SM) Request message to a SMF.

Step 43: after the SMF receives the SM Request, mapping, by the SMF, non-GBR QoS flows in a corresponding PDU session to a default bearer, setting an EPS bearer identifier of the default bearer as a PDU session identifier or temporarily setting the EPS bearer identifier of the default bearer as the PDU session identifier; mapping all GBR QoS flows in the corresponding PDU session to a plurality of dedicated bearers, and temporarily setting the EPS bearer identifier of each of the dedicated bearers to a null value, a temporary value, or a reserved value after the mapping to the dedicated bearers is completed.

Step 44: returning, by the SMF to the AMF, a Session Management (SM) Response message, wherein the SM Response carries a PDU Session Establishment Accept message, the PDU Session Establishment Accept includes information of the mapped EPS bearer, the information of the EPS bearer includes an identifier of a default bearer and a QFI corresponding to the default bearer, and an identifier of a dedicated bearer and a QFI corresponding to the dedicated bearer.

Step 45: transmitting, by the AMF to the UE, a PDU Session Establishment Accept.

Step 46: allocating, by the UE, an EPS bearer identifier to each of the dedicated bearers, based on the information of the EPS bearer in the received PDU Session Establishment Accept which includes a linked EPS bearer ID, QFI, and the like, as shown in Table 1 below.

TABLE 1

| IE | Value |
| --- | --- |
| Linked EPS bearer ID | PDU session ID |
| Bearer ID | Null |
| QFI | Flow 2, 3 |
| Bearer ID | Null |
| QFI | Flow 4 |

Step 47: returning, by the UE to the AMF, a PDU Session Establishment Complete message, wherein the PDU Session Establishment Complete carries perfected information of an EPS bearer (updating a value set temporarily), as shown in Table 2 below.

TABLE 2

| IE | Value |
| --- | --- |
| Linked EPS bearer ID | PDU session ID |
| Bearer ID | 12 |
| QFI | Flow 2, 3 |
| Bearer ID | 13 |
| QFI | Flow 4 |

Step 48: returning, by the AMF to the SMF, a Session Management (SM) Complete message, wherein the SM Complete carries information of an EPS bearer to which a PDU session is mapped successfully.

Second Example

The first example corresponds to a case in which the UE allocates the EPS bearer identifier based on the QFI, however the UE may also allocate the EPS bearer identifier based on the TFT, other than the case in which the UE allocates the EPS bearer identifier based on the QFI, as in the second example. FIG. 5 shows a flowchart of the second example of a process of allocating an EPS bearer identifier provided in the present disclosure. Referring to FIG. 5, the process of allocating the EPS bearer identifier in the second example includes following steps 51-58.

Step 51: transmitting, by the UE, a PDU Session Establishment Request message to the AMF.

Step 52: after the AMF receives the PDU Session Establishment Request message from the UE, transmitting, by the AMF, a Session Management (SM) Request message to the SMF.

Step 53: after the SMF receives the SM Request, mapping, by the SMF, non-GBR QoS flows in a corresponding PDU session to a default bearer, setting an EPS bearer identifier of the default bearer as a PDU session identifier or temporarily setting the EPS bearer identifier of the default bearer as the PDU session identifier; mapping all GBR QoS flows in the corresponding PDU session to a plurality of dedicated bearers, and temporarily setting the EPS bearer identifier of each of the dedicated bearers to a null value, a temporary value, or a reserved value after the mapping to the dedicated bearers is completed.

Step 54: returning, by the SMF to the AMF, a Session Management (SM) Response message, wherein the SM Response carries a PDU Session Establishment Accept message, the PDU Session Establishment Accept includes information of the mapped EPS bearer, the information of the EPS bearer includes an identifier of a default bearer and a TFT (which is optional) corresponding to the default bearer, and an identifier of a dedicated bearer and a TFT corresponding to the dedicated bearer.

Step 55: transmitting, by the AMF to the UE, a PDU Session Establishment Accept.

Step 56: allocating, by the UE, an EPS bearer identifier to each of the dedicated bearers, based on the information of the EPS bearer in the received PDU Session Establishment Accept which includes a linked EPS bearer ID, TFT, and the like, as shown in Table 3 below.

TABLE 3

| IE | Value |
| --- | --- |
| PDU session ID | 1 |
| Linked EPS bearer ID | PDU session ID |
| Bearer ID | Null |
| TFT | TFT value 1 |
| Bearer ID | Null |
| TFT | TFT value 2 |

Step 57: returning, by the UE to the AMF, a PDU Session Establishment Complete message, wherein the PDU Session Establishment Complete carries perfected information of an EPS bearer (updating a value set temporarily), as shown in Table 4 below.

TABLE 4

| IE | Value |
| --- | --- |
| PDU session ID | 1 |
| Linked EPS bearer ID | 5 |
| Bearer ID | 12 |
| TFT | TFT value 1 |
| Bearer ID | 13 |
| TFT | TFT value 2 |

Step 58: returning, by the AMF to the SMF, a Session Management (SM) Complete message, wherein the SM Complete carries information of an EPS bearer to which a PDU session is mapped successfully.

The first example is similar to the second example, difference between the first example and the second example is that related information of the EPS bearer in the first example includes the QFI so that the UE allocates the EPS bearer identifier according to the QFI, and the related information of the EPS bearer in the second example includes the TFT so that the UE allocates the EPS bearer identifier according to the TFT.

Third Example

In the first example and the second example, the UE allocates the EPS bearer identifier. However, besides the examples in which the UE allocates the EPS bearer identifier, the AMF may also allocate the EPS bearer identifier, as in the third example. Since a role of the AMF is changed to a MME in an inter-operation scenario between the 5G network and the LTE network, the AMF may also allocate the EPS bearer identifier.

Figure 6:
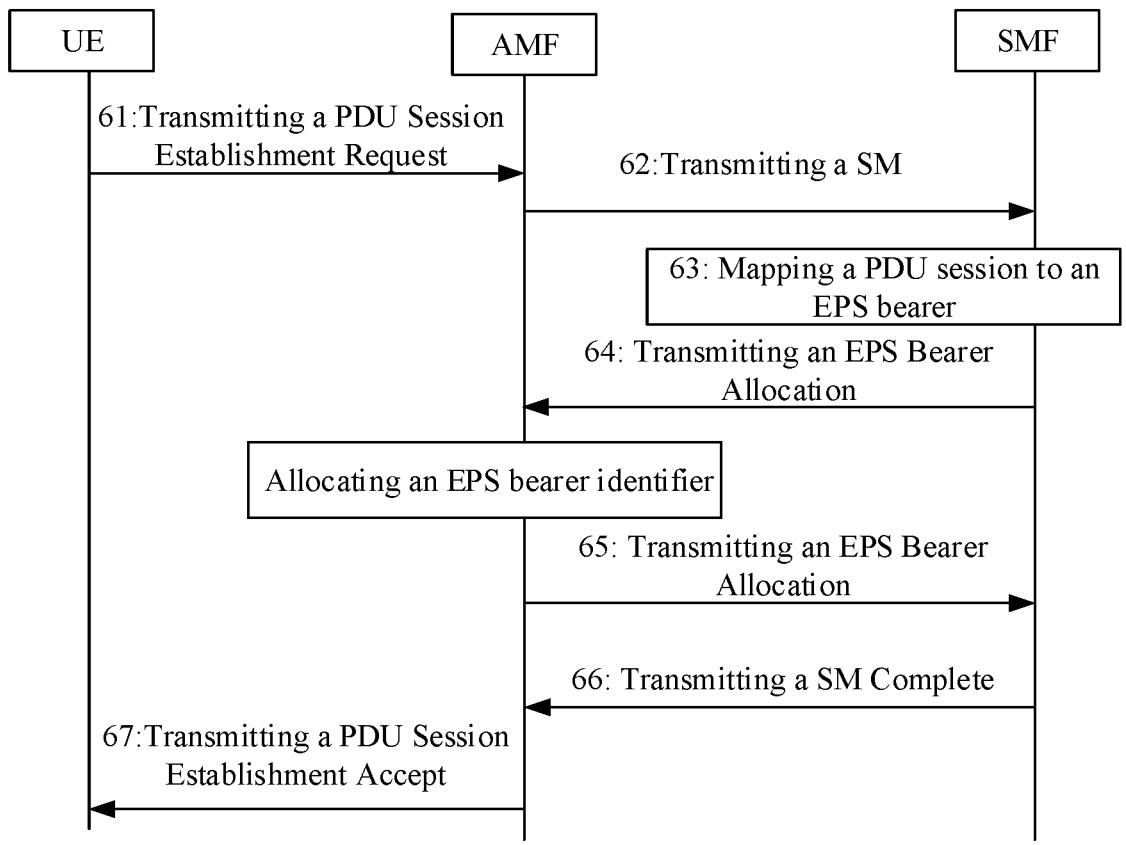
FIG. 6 is a flowchart of a third example of a process of allocating an EPS bearer identifier according to the present disclosure.

Referring to FIG. 6, FIG. 6 illustrates a flowchart of the third example of a process of allocating an EPS bearer identifier provided in the present disclosure. The process of allocating the EPS bearer identifier in the third example includes following steps 61-67.

Step 61: transmitting, by the UE, a PDU Session Establishment Request message to the AMF.

Step 62: after the AMF receives the PDU Session Establishment Request message from the UE, transmitting, by the AMF, a Session Management (SM) Request message to the SMF.

Step 63: after the SMF receives the SM Request, mapping, by the SMF, non-GBR QoS flows in a corresponding PDU session to a default bearer, setting an EPS bearer identifier of the default bearer as a PDU session identifier; mapping all GBR QoS flows in the corresponding PDU session to a plurality of dedicated bearers, and temporarily setting the EPS bearer identifier of each of the dedicated bearers to a null value, a temporary value, or a reserved value after the mapping to the dedicated bearers is completed.

Step 64: transmitting, by the SMF to the AMF, an EPS Bearer Allocation Request message, wherein the EPS Bearer Allocation Request carries an EPS bearer list.

Step 65: allocating, by the AMF, an EPS bearer identifier to each EPS bearer based on the EPS bearer list, and transmitting an EPS Bearer Allocation Response message to the SMF, wherein the EPS Bear Allocation Response includes EPS bearer identifiers having been allocated.

Step 66: perfecting, based on the EPS bear identifiers having been allocated, the mapped EPS bearer information, and transmitting a Session Management (SM) Response message to the AMF, wherein the SM Response carries a PDU Session Establishment Accept message, the PDU Session Establishment Accept includes mapped EPS bearer information being perfected, the EPS bearer information includes an identifier of a default bearer and a QFI corresponding to the default bearer, and a dedicated bearer and a QFI corresponding to the dedicated bearer.

Step 67: transmitting, by the AMF, a PDU Session Establishment Accept to the UE for notifying the UE of the perfected EPS bearer information.

The method of allocating the EPS bearer identifier in FIG. 2 or FIG. 3 of the present disclosure may request, by transmitting the first message or the second message, the UE or the AMF to allocate respective bearer identifiers to the mapped EPS bearer. Thus, the problem of allocating bearer identifiers for mapped EPS bearers is solved, and the normal operation of the inter-system handover between the 5G network and the LTE network is realized.

Figure 7:
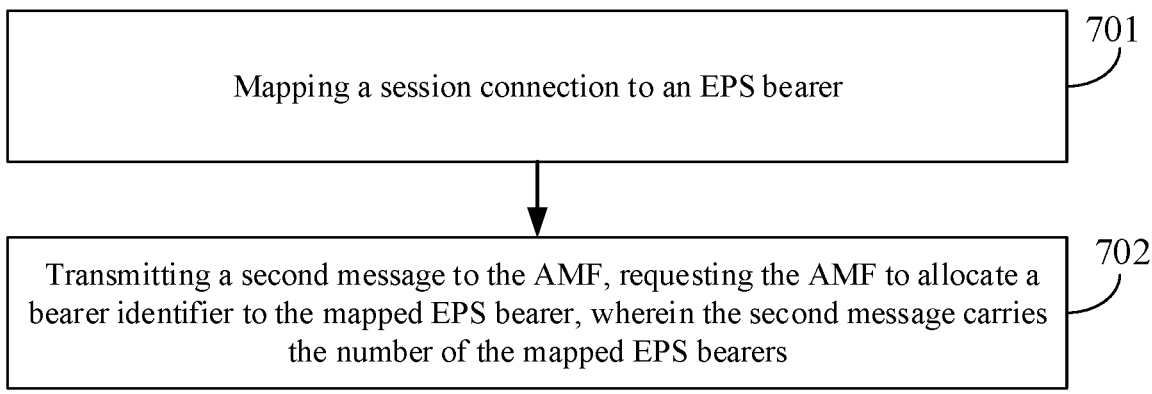
FIG. 7 is a flowchart of a method of allocating an EPS bearer identifier according to the present disclosure.

Referring to FIG. 7, FIG. 7 shows a flowchart of a method of allocating an EPS bearer identifier provided in the present disclosure. The embodiment of the present disclosure provides a method of allocating an EPS bearer identifier. The method is applied to an SMF, and includes following steps 701 to 702, which are described in detail below.

Step 701: mapping a session/connection to an EPS bearer.

The session/connection may be a session/connection in a 5G system, i.e., a 5G session/connection or a Packet Data Unit (PDU, for short) session/connection. After the SMF receives a session management request message from an AMF, the SMF may map a related session/connection to the EPS bearer, that is, perform mapping of the session/connection to the EPS bearer.

Specifically, when the session/connection is the PDU session/connection, the mapping of the PDU session/connection to the EPS bearer performed by the SMF may specifically include: mapping non-GBR QoS flows in the PDU session to a default bearer, and setting an EPS bearer identifier of the default bearer as a PDU session identifier or temporarily setting the EPS bearer identifier of the default bearer as a PDU session identifier; mapping all GBR QoS flows in the PDU session to a plurality of dedicated bearers, and after the mapping to the dedicated bearers is completed, setting associated EPS bearer identifiers of all of the dedicated bearers as PDU session identifiers, and temporarily setting EPS bearer identifiers of all of the dedicated bearers as a null value, temporary values or reserved values; whereas if a value of the PDU session identifier does not fall within 5-15 or if the associated EPS bearer identifiers need to be set as temporary values because of a requirement of network configuration or strategy, a UE may reallocate the associated EPS bearer identifiers subsequently.

It should be noted that a rule of the mapping in the present disclosure may be determined by an implementation of the SMF or a policy of an operator, and the present disclosure is not limited thereto.

Step 702: transmitting a second message to the AMF, requesting the AMF to allocate an EPS bearer identifier to the mapped EPS bearer, wherein the second message carries the number of the mapped EPS bearers.

The number of the mapped EPS bearers is the number of the dedicated bearers. Before the SMF transmits the second message to the AMF, the SMF may receive an EPS bearer context request message transmitted by the AMF so that the AMF allocates a uniform bearer identifier for mapped EPS bearers.

In this way, after the AMF receives the number of the mapped EPS bearers, the AMF may allocate EPS bearer identifiers corresponding to the number of the mapped EPS bearers based on the number of the mapped EPS bearers. For example, when the number of the mapped EPS bearers is N, the AMF may allocate N EPS bearer identifiers. After allocation of the EPS bearer identifiers is completed, the AMF returns the allocated EPS bearer identifiers to the SMF, and the SMF fills the allocated EPS bearer identifiers into corresponding EPS bearers and transmits to the AMF the EPS bearer context having been mapped successfully.

Next, a process of allocating the EPS bearer identifier in a specific example of the embodiment shown in FIG. 7 will be described in detail with reference to FIG. 8.

In the specific example of the embodiment of the present disclosure shown in FIG. 7, the AMF allocates a uniform bearer identifier for mapped EPS bearers. Since a role of the AMF is changed to a MME in an inter-operation scenario between the 5G network and the LTE network, the AMF may also allocate the EPS bearer identifier.

Figure 8:
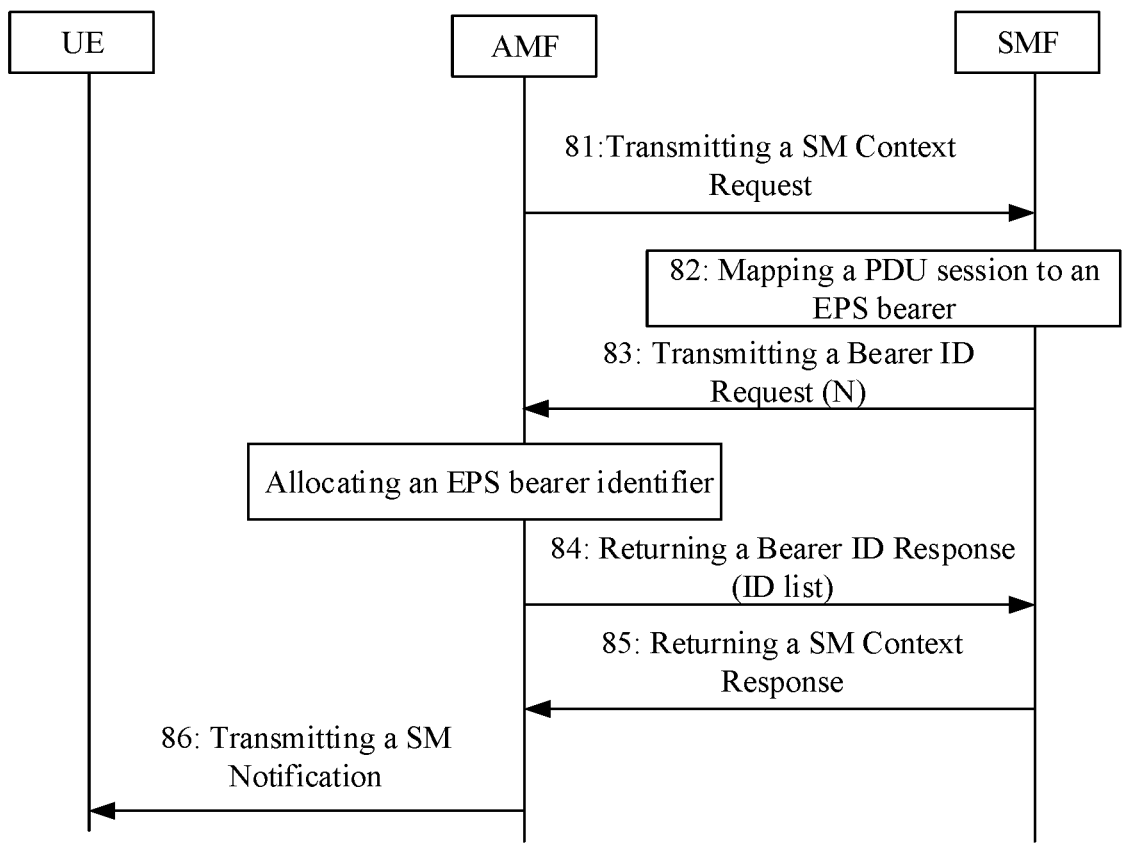
FIG. 8 is a flowchart of a specific example of a process of allocating an EPS bearer identifier according to the present disclosure.

Referring to FIG. 8, the process of allocating an EPS bearer identifier in this specific example includes following steps 81-86.

Step 81: after the AMF receives a handover request transmitted by a RAN, transmitting, by the AMF, a Session Management (SM) Context Request message to the SMF.

Step 82: after the SMF receives the SM Context Request, mapping, by the SMF, non-GBR QoS flows in a corresponding PDU session to a default bearer, and setting an EPS bearer identifier of the default bearer as a PDU session identifier or temporarily setting an EPS bearer identifier of the default bearer as a PDU session identifier as a PDU session identifier; mapping all GBR QoS flows in the corresponding PDU session to a plurality of dedicated bearers, and counting the number N of the dedicated bearers.

Step 83: transmitting, by the SMF, an EPS bearer identifier (ID) Request message to the AMF based on the counted number N of the dedicated bearers, wherein the Bearer ID Request includes a PDU session identifier and the number N of the dedicated bearers.

Step 84: determining, by the AMF, EPS bearer identifiers, that is, determining a default bearer identifier list and a dedicated bearer identifier list, and returning a Bearer ID Response message to the SMF.

Step 85: based on the received default bearer identifier list and the received dedicated bearer identifier list, filling, by the SMF, a corresponding default bearer identifier and a corresponding dedicated bearer identifier into the EPS bearer context generated by the mapping of the PDU session, and returning a Session Management (SM) Context Response message to the AMF, wherein the SM Context Response carries the EPS bearer context having been mapped successfully.

Step 86: transmitting, by the AMF, a Session Management (SM) Notification message to the UE to notify the UE of all EPS bearer contexts having been mapped successfully, so that the UE is informed of association between the PDU session and the EPS bearer.

The method of allocating the EPS bearer identifier shown in FIG. 7 of the present disclosure may request, by transmitting the second message, the AMF to allocate a uniform bearer identifier to the mapped EPS bearer. Thus, the problem of allocating bearer identifiers for mapped EPS bearers is solved, and the normal operation of the inter-system handover between the 5G network and the LTE network is realized.

Figure 9:
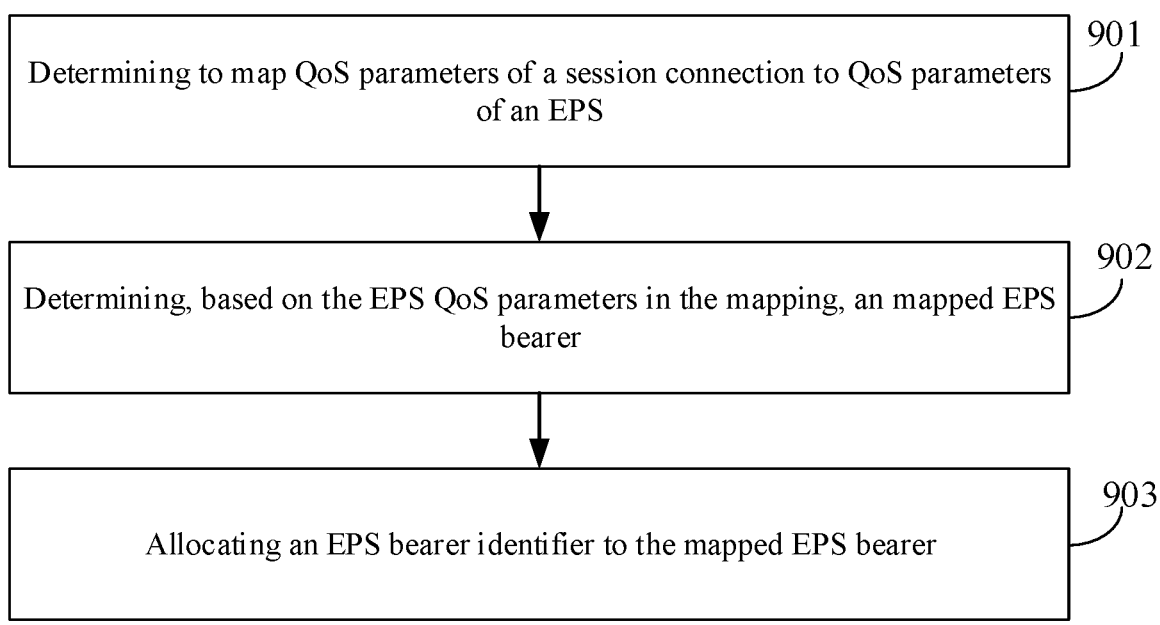
FIG. 9 is a flowchart of a method of allocating an EPS bearer identifier according to the present disclosure.

Referring to FIG. 9, FIG. 9 shows a flowchart of a method of allocating an EPS bearer identifier in the present disclosure is shown. The embodiment provides the method of allocating an EPS bearer identifier, wherein the method is applied to a Policy and Charging Control system (PCC, for short) or a Policy Control Function (PCF, for short). The method includes following steps 901 to 903, which are described in detail below.

Step 901: determining to map QoS parameters of a session/connection to QoS parameters of an EPS.

The session/connection may be a session/connection in a 5G system, i.e., a 5G session/connection or a PDU session/connection. In a process of establishing the session/connection, the PCC or the PCF may determine to map the QoS parameters of the session/connection in the 5G system to the QoS parameters of the EPS, based on a type of a SMF serving the session/connection or based on a request from the SMF serving the session/connection. The SMF serving the session/connection is, for example, a SMF that supports both a 5G session management function and an EPS Packet Data Gateway Control (PGW-C) function.

For example, the PCF may determine, based on a request message from the SMF or the type of the SMF, to map QoS parameters of a certain PDU session to EPS QoS parameters. A specific mode of the mapping may be based on an operator's rule or a configuration policy, the present disclosure is not limited thereto. The EPS QoS parameters in the mapping may include a mapping relation of a QoS flow to an EPS bearer, QoS parameters of the EPS bearer, and/or a TFT of the EPS bearer, and the like.

Step 902: determining, based on the EPS QoS parameters in the mapping, a mapped EPS bearer.

After the EPS QoS parameters in the mapping are acquired, the mapped EPS bearer may be determined based on the EPS QoS parameters.

Step 903: allocating an EPS bearer identifier to the mapped EPS bearer.

When the PCC or the PCF allocates the EPS bearer identifier to the mapped EPS bearer, the PCC or the PCF specifically allocates the EPS bearer identifier to each mapped EPS bearer. Before the PCF allocates the EPS bearer identifier, the PCF needs to determine information of EPS bearers to which all PDU sessions of the UE are mapped, so as to ensure that the allocated EPS bearer identifier is unique within the UE.

In a specific embodiment of the present disclosure, the method further includes a step 904.

Step 904: transmitting, to the SMF, information of the mapped EPS bearer, wherein the information of the EPS bearer includes the EPS bearer identifier and the QoS parameters of the EPS bearer.

In this way, the SMF may be informed of relevant information of the EPS bearer in a timely manner, and ensure a normal operation of a handover operation. The SMF may further transmit the received information of the EPS bearer to the UE.

The method of allocating the EPS bearer identifier of the present disclosure shown in FIG. 9 may, by determining to map the QoS parameters of the session/connection to the QoS parameters of the EPS and determining, based on the EPS QoS parameters in the mapping, the mapped EPS bearer, allocate an EPS bearer identifier to the mapped EPS bearer, and allocation of the EPS bearer identifier to the mapped EPS bearer may be achieved.

The above embodiments illustrate the method of allocating the EPS bearer identifier of the present disclosure, and a device of allocating an EPS bearer identifier in the present disclosure will be described below.

Figure 10:
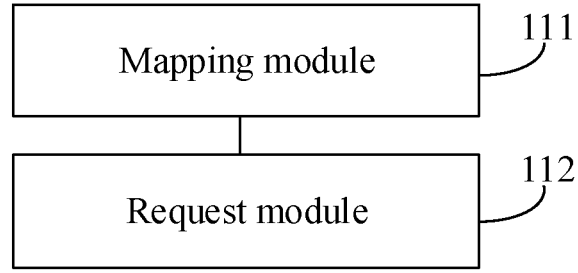
FIG. 10 is a structural schematic diagram of a device of allocating an EPS bearer identifier according to the present disclosure.

Referring to FIG. 10, FIG. 10 is a schematic structural diagram of a device of allocating an EPS bearer identifier provided in the present disclosure. This embodiment provides a device of allocating an EPS bearer identifier. The device is applied to the SMF, and includes a mapping module 111 and a request module 112. The mapping module 111 is configured to map a session/connection to an Evolved Packet System (EPS) bearer. The request module 112 is configured to request a User Equipment (UE) or an Access and Mobility Management Function (AMF) entity to allocate an EPS bearer identifier to a mapped EPS bearer.

In this embodiment, the request module 112 includes a first transmission unit and a second transmission unit. The first transmission unit is configured to transmit a first message to the UE to request the UE to allocate an EPS bearer identifier to the mapped EPS bearer, wherein the first message carries information of the mapped EPS bearer. The second transmission unit is configured to transmit a second message to the AMF to request the AMF to allocate an EPS bearer identifier to the mapped EPS bearer, wherein the second message carries information of the mapped EPS bearer or the number of the mapped EPS bearers.

Specifically, an EPS bearer identifier of a dedicated bearer in the information of the EPS bearer is temporarily set to a null value, a temporary value, or a reserved value.

Specifically, an EPS bearer identifier of a default bearer in the information of the EPS bearer is set as a Packet Data Unit (PDU) session identifier or is temporarily set as the PDU session identifier.

Specifically, the information of the EPS bearer may carry a mapping relation between the EPS bearer and a Quality of Service (QoS) data flow (QoS flow) or a mapping relation between the EPS bearer and a Traffic Flow Template (TFT).

Specifically, the number of the mapped EPS bearers is the number of dedicated bearers.

Specifically, the first message is a PDU Session Establishment Accept message.

In this embodiment, the device further includes a first reception module. The first reception module is configured to receive a PDU Session Establishment Request message from the UE; or receive an EPS bearer context request message transmitted by the AMF.

In the specific embodiments of the disclosure, the device further includes a second reception module and a first determination module. The second reception module is configured to receive an EPS bearer identifier of a mapped EPS bearer being allocated to the mapped EPS bearer by the UE or the AMF. The first determination module is configured to determine an EPS bearer context or parameter information of an associated EPS bearer based on the EPS bearer identifier and the information of the mapped EPS bearer.

Further, when the AMF allocates the EPS bearer identifier to the mapped EPS bearer, the device further includes a notifying module. The notifying module is configured to notify the UE of the EPS bearer context or the parameter information of the related EPS bearer.

Figure 11:
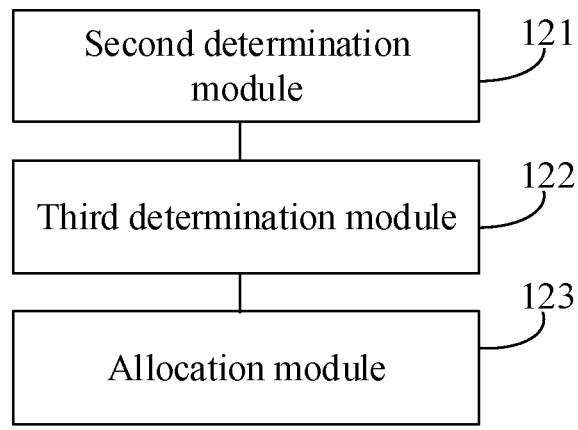
FIG. 11 is a structural schematic diagram of a device of allocating an EPS bearer identifier according to the present disclosure.

Referring to FIG. 11, FIG. 11 is a schematic structural diagram of a device of allocating an EPS bearer identifier provided in the present disclosure. The embodiments also provide a device of allocating an EPS bearer identifier. The device is applied to a Policy and Charging Control (PCC) system or a Policy Control Function (PCF) entity, and includes a second determination module 121, a third determination module 122, and an allocation module 123. The second determination module 121 is configured to determine to map Quality of Service (QoS) parameters of a session/connection to QoS parameters of an Evolved Packet System (EPS). The third determination module 122 is configured to determine, based on the EPS QoS parameters in the mapping, a mapped EPS bearer. The allocation module 123 is configured to allocate an EPS bearer identifier to the mapped EPS bearer.

Specifically, the second determination module 121 is specifically configured to determine, based on a type of a Session Management Function (SMF) entity serving the session/connection, to map QoS parameters of the session/connection to EPS QoS parameters; or determine, based on a request from the SMF serving the session/connection, to map QoS parameters of the session/connection to EPS QoS parameters.

The type of the SMF is an SMF that supports both a 5G session management function and an EPS Packet Data Gateway Control (PGW-C) function.

Further, the device further includes a transmission module. The transmission module is configured to transmit, to the SMF, information of the mapped EPS bearer, wherein the information of the EPS bearer includes the EPS bearer identifier and the QoS parameters of the EPS bearer.

The device of allocating the EPS bearer identifier shown in FIG. 10 may, by mapping the session/connection to the EPS bearer and requesting the UE or the AMF to allocate the EPS bearer identifier to the mapped EPS bearer, allocate the EPS bearer identifier to the mapped EPS bearer when performing the mapping of the session/connection to the EPS bearer, thereby achieving the normal operation of the inter-system handover between the 5G network and the LTE network.

The present disclosure also provides an SMF. The SMF includes a first storage, a first processor, and a computer program stored on the first storage and executable on the first processor, wherein, when the first processor executes the computer program, the first processor may implement steps in the method of allocating the EPS bearer identifier shown in any one of FIG. 2 to FIG. 8.

Figure 12:
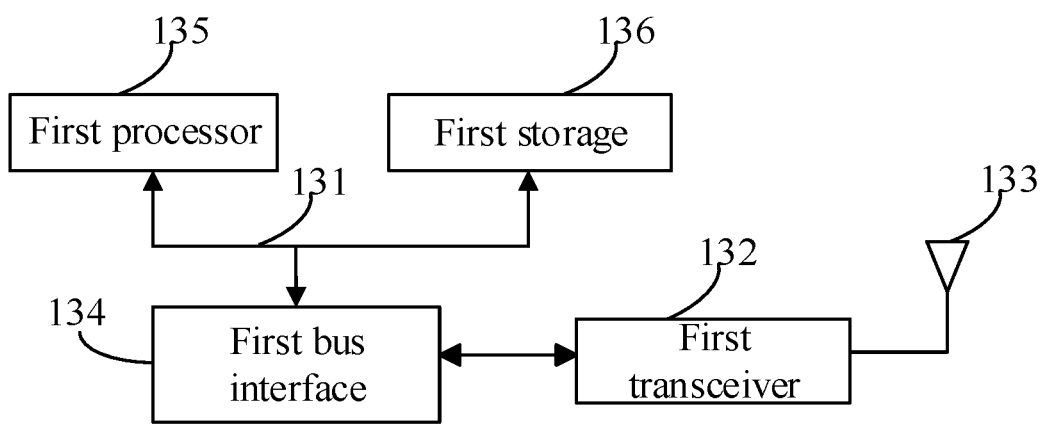
FIG. 12 is a structural schematic diagram of a SMF according to the present disclosure.

Specifically, referring to FIG. 12, FIG. 12 is a schematic structural diagram of the SMF of the present disclosure. The SMF in this embodiment specifically includes a first bus 131, a first transceiver 132, a first antenna 133, a first bus interface 134, a first processor 135, and a first storage 136.

The first processor 135 is configured to read a computer program in the first storage 136 and perform steps of mapping the session/connection to the EPS bearer, and requesting the UE or the AMF to allocate an EPS bearer identifier to the mapped EPS bearer. The first transceiver 132 is configured to receive and transmit data under a control of the first processor 135.

Specifically, the first processor 135 is further configured to transmit a first message to the UE to request the UE to allocate an EPS bearer identifier to the mapped EPS bearer, wherein the first message carries information of the mapped EPS bearer; or transmit a second message to the AMF to request the AMF to allocate an EPS bearer identifier to the mapped EPS bearer, wherein the second message carries information of the mapped EPS bearer or the number of the mapped EPS bearers.

Specifically, the EPS bearer identifier of a dedicated bearer in the information of the EPS bearer is temporarily set to a null value, a temporary value, or a reserved value.

Specifically, an EPS bearer identifier of a default bearer in the information of the EPS bearer is set as a Packet Data Unit (PDU) session identifier or is temporarily set as the PDU session identifier.

Specifically, the information of the EPS bearer may carry a mapping relation between the EPS bearer and a Quality of Service (QoS) data flow (QoS flow) or a mapping relation between the EPS bearer and a Traffic Flow Template (TFT).

Specifically, the number of the mapped EPS bearers is the number of dedicated bearers.

Specifically, the first message is a PDU Session Establishment Accept message.

Specifically, the first processor 135 is further configured to receive a PDU Session Establishment Request message from the UE; or receive an EPS bearer context request message transmitted by the AMF.

Specifically, the first processor 135 is further configured to receive an EPS bearer identifier of a mapped EPS bearerr being allocated to the mapped EPS bearer by the UE or the AMF; and determine an EPS bearer context or parameter information of a related EPS bearer based on the EPS bearer identifier and the information of the mapped EPS bearer.

Specifically, when the AMF allocates the EPS bearer identifier to the mapped EPS bearer, the first processor 135 is further configured to notify the UE of the EPS bearer context or the parameter information of the related EPS bearer.

In FIG. 12, a first bus architecture (represented by the first bus 131) may include any number of interconnected first buses and bridges. Specifically, one or more processors such as the first processor 135 and a first storage such as the first storage 136 are linked together by the first bus 131. The first bus 131 may also link together various other circuits such as peripheral devices, voltage regulators, and power management circuits, etc., which are well known in the art and therefore will not be further described herein. A first bus interface 134 provides an interface between the first bus 131 and the first transceiver 132. The first transceiver 132 may be one or more elements such as a plurality of transmitters and a plurality of receivers, configured to provide units for communicating with various other devices over a transmission medium. Data processed by the first processor 135 is transmitted over a wireless medium after being transmitted by the first antenna 133. Further, the first antenna 133 further receives data and transmits data to the first processor 135.

The first processor 135 is responsible for managing the first bus 131 and general transactions, and may also provide various functions such as timing, peripheral interfaces, voltage regulation, power management, and other control functions. The first storage 136 may be configured to store data used by the first processor 135 when the first processor 135 performs operations.

Optionally, the first processor 135 may be a CPU, an ASIC, a FPGA, or a CPLD.

The present disclosure also provides a PCF. The PCF includes a second storage, a second processor, and a computer program stored on the second storage and executable on the second processor, wherein, when the second processor executes the computer program, the second processor may implement steps in the method of allocating the EPS bearer identifier shown in FIG. 9.

From a perspective of implemented function, components of the PCF in this embodiment of the present disclosure are same as those of the PCC in the present disclosure. Thus, the PCF is described in detail herein, and the PCC is not described again.

Figure 13:
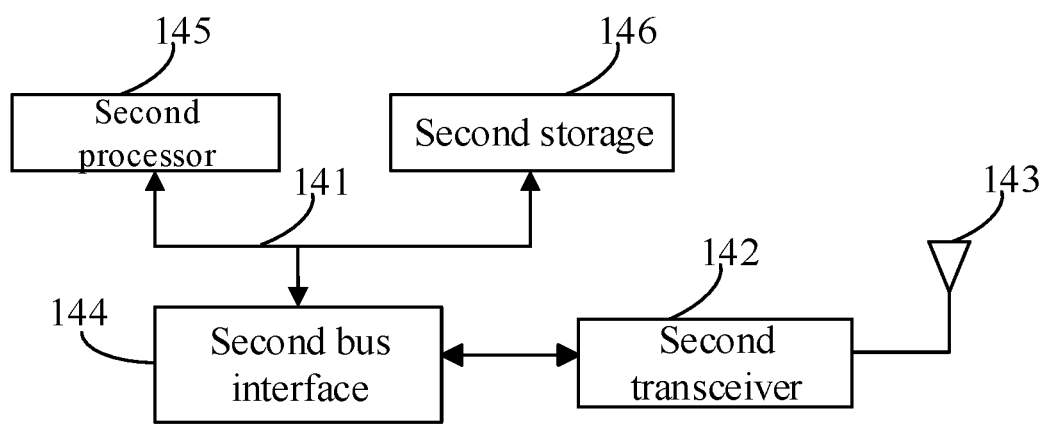
FIG. 13 is a structural schematic diagram of a PCF according to the present disclosure.

Specifically, Referring to FIG. 13, FIG. 13 shows a schematic structural diagram of the PCF of the present disclosure. The PCF in this embodiment specifically includes a second bus 141, a second transceiver 142, a second antenna 143, a second bus interface 144, a second processor 145, and a second storage 146.

The second processor 145 is configured to read a computer program in the second storage 146 and perform steps of: determining to map Quality of Service (QoS) parameters of a session/connection to QoS parameters of an Evolved Packet System (EPS); determining, based on the EPS QoS parameters in the mapping, a mapped EPS bearer; and allocating an EPS bearer identifier to the mapped EPS bearer. The second transceiver 142 is configured to receive and transmit data under a control of the second processor 145.

Specifically, the second processor 145 is further configured to determine, based on a type of a Session Management Function (SMF) entity serving the session/connection, to map QoS parameters of the session/connection to EPS QoS parameters; or determine, based on a request from the SMF serving the session/connection, to map QoS parameters of the session/connection to EPS QoS parameters.

Specifically, the type of the SMF is an SMF that supports both a 5G session management function and an EPS Packet Data Gateway Control (PGW-C) function.

Specifically, the second processor 145 is further configured to transmit, to the SMF, information of the mapped EPS bearer, wherein the information of the EPS bearer includes the EPS bearer identifier and the QoS parameters of the EPS bearer.

In FIG. 13, a second bus architecture (represented by the second bus 141) may include any number of interconnected second buses and bridges. Specifically, one or more processors such as the second processor 145 and a second storage such as the second storage 146 are linked together by the second bus 141. The second bus 141 may also link together various other circuits such as peripheral devices, voltage regulators, and power management circuits, etc., which are well known in the art and therefore will not be further described herein. A second bus interface 144 provides an interface between the second bus 141 and the second transceiver 142. The second transceiver 142 may be one or more elements such as a plurality of transmitters and a plurality of receivers, configured to provide units for communicating with various other devices over a transmission medium. Data processed by the second processor 145 is transmitted over a wireless medium after being transmitted by the second antenna 143. Further, the second antenna 143 further receives data and transmits data to the second processor 145.

The second processor 145 is responsible for managing the second bus 141 and general transactions, and may also provide various functions such as timing, peripheral interfaces, voltage regulation, power management, and other control functions. The second storage 146 may be configured to store data used by the second processor 145 when the second processor 145 performs operations.

Optionally, the second processor 145 may be a CPU, an ASIC, a FPGA, or a CPLD.

It should be noted that terms such as "comprising", "including", "include", "comprise", or any other variant thereof are intended to cover non-exclusive inclusion such that processes, methods, articles or devices including a series of elements include not only those elements, but also other elements that are not explicitly listed, or may further include elements inherent to such processes, methods, articles, or devices. An element defined by a statement "including one . . . ", if no further limitation is defined, does not exclude presence of another identical element in the process, the method, the article or the device besides the element.

The above-mentioned serial numbers in the embodiments of the present disclosure are for the purpose of description only, and do not represent advantages or disadvantages of the embodiments.

From the above description of the embodiments, it will be clear to those skilled in the art that the method in the embodiments described above may be implemented by means of software plus necessary general hardware platforms, or by means of hardware. However, in many cases, the former is a better implementation. Based on such an understanding, essences of the technical solutions of the present disclosure or parts of the present disclosure contributing to the related art may be embodied in a form of a software product stored in a storage medium (such as ROM/RAM, magnetic disks, optical discs), the storage medium includes a plurality of instructions used to cause a terminal (which may be a mobile phone, a computer, a server, an air conditioner, or a network device, etc.) to perform the methods described in various embodiments of the present disclosure.

The foregoing are merely optional embodiments of the present disclosure, and it should be noted that several modifications and refinements may be made by those of ordinary skills in the art without departing from the principles of the present disclosure. These improvements and refinements should also be considered to be within the scope of the present disclosure.

What is claimed is:

1. A method of allocating an Evolved Packet System (EPS) bearer identifier, the method being applied to a Session Management Function (SMF) entity and comprising:

mapping a session/connection to an Evolved Packet System (EPS) bearer;

requesting a User Equipment (UE) or an Access and Mobility management Function (AMF) entity to allocate an EPS bearer identifier to the mapped EPS bearer;

receiving the EPS bearer identifier of the mapped EPS bearer being allocated to the mapped EPS bearer by the UE or the AMF; and determining an EPS bearer context or parameter information of a related EPS bearer based on the EPS bearer identifier and the information of the mapped EPS bearer, wherein requesting the UE or the AMF entity to allocate the EPS bearer identifier to the mapped EPS bearer, comprises:

transmitting a first message to the UE to request the UE to allocate the EPS bearer identifier to the mapped EPS bearer, wherein the first message carries information of the mapped EPS bearer; or transmitting a second message to the AMF to request the AMF to allocate the EPS bearer identifier to the mapped EPS bearer, wherein the second message carries information of the mapped EPS bearer or the number of the mapped EPS bearers.

2. The method according to claim 1, wherein the information of the EPS bearer carries a mapping relation between the EPS bearer and a Quality of Service data flow (QoS flow) or a mapping relation between the EPS bearer and a Traffic Flow Template (TFT).

3. The method according to claim 1, wherein the first message is a Packet Data Unit (PDU) Session Establishment Accept message.

4. The method according to claim 1, wherein before transmitting the second message to the AMF, the method further comprises:

receiving a Packet Data Unit (PDU) Session Establishment Request message from the UE; or receiving an EPS bearer context request message transmitted by the AMF.

5. The method according to claim 1, wherein when the AMF allocates the EPS bearer identifier to the mapped EPS bearer, the method further comprises:

notifying the UE of the EPS bearer context or the parameter information of the related EPS bearer.

6. A device of allocating an Evolved Packet System (EPS) bearer identifier, the device being applied to a Session Management Function (SMF) entity and comprising:

a mapping circuit, configured to map a session/connection to an Evolved Packet System (EPS) bearer;

a request circuit, configured to request a User Equipment (UE) or an Access and Mobility management Function (AMF) entity to allocate an EPS bearer identifier to a mapped EPS bearer;

a second reception circuit, configured to receive an EPS bearer identifier of a mapped EPS bearer being allocated to the mapped EPS bearer by the UE or the AMF; and a first determination circuit, configured to determine an EPS bearer context or parameter information of a related EPS bearer based on the EPS bearer identifier and the information of the mapped EPS bearer, wherein the request circuit comprises:

a first transmission subcircuit, configured to transmit a first message to the UE to request the UE to allocate an EPS bearer identifier to the mapped EPS bearer, wherein the first message carries information of the mapped EPS bearer; and a second transmission subcircuit, configured to transmit a second message to the AMF to request the AMF to allocate an EPS bearer identifier to the mapped EPS bearer, wherein the second message carries information of the mapped EPS bearer or the number of EPS bearers.

7. The device according to claim 6, wherein the information of the EPS bearer carries a mapping relation between the EPS bearer and a Quality of Service data flow (QoS flow) or a mapping relation between the EPS bearer and a Traffic Flow Template (TFT).

8. The device according to claim 6, wherein the first message is a Packet Data Unit (PDU) Session Establishment Accept message.

9. The device according to claim 6, further comprising:
a first reception circuit, configured to receive a Packet Data Unit (PDU) Session Establishment Request message from the UE, or receive an EPS bearer context request message transmitted by the AMF.

10. The device according to claim 6, wherein the AMF allocates the EPS bearer identifier to the mapped EPS bearer, and the device further comprises:
a notifying circuit, configured to notify the UE of the EPS bearer context or the parameter information of the related EPS bearer.

11. A Session Management Function (SMF) entity, comprising:
a first storage, a first processor, and a computer program stored on the first storage and executable on the first processor,
wherein when the first processor executes the computer program, the first processor implements steps of the method according to claim 1.

12. The SMF entity according to claim 11, wherein the information of the EPS bearer carries a mapping relation between the EPS bearer and a Quality of Service data flow (QoS flow) or a mapping relation between the EPS bearer and a Traffic Flow Template (TFT).

13. The SMF entity according to claim 11 wherein the first message is a Packet Data Unit (PDU) Session Establishment Accept message.

14. The SMF entity according to claim 11, wherein before transmitting the second message to the AMF, the first processor is further configured to implement:
receiving a Packet Data Unit (PDU) Session Establishment Request message from the UE; or
receiving an EPS bearer context request message transmitted by the AMF.

15. A non-volatile storage medium, comprising:
a program and an instruction stored on the non-volatile storage medium, wherein when the program and the instruction are executed by a processor, the processor implements the method according to claim 1.

* * * * *